United States Patent
Nakamura et al.

(10) Patent No.: US 12,244,152 B2
(45) Date of Patent: Mar. 4, 2025

(54) STRUCTURAL BODY, SYSTEM, AND STRUCTURAL PRODUCT

(71) Applicant: Panasonic Intellectual Property Management Co., Ltd., Osaka (JP)

(72) Inventors: Masahiro Nakamura, Tokyo (JP); Shozo Oshio, Osaka (JP); Yuki Kotani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 130 days.

(21) Appl. No.: 17/613,547

(22) PCT Filed: May 15, 2020

(86) PCT No.: PCT/JP2020/019383
§ 371 (c)(1),
(2) Date: Nov. 23, 2021

(87) PCT Pub. No.: WO2020/241296
PCT Pub. Date: Dec. 3, 2020

(65) Prior Publication Data
US 2022/0239153 A1   Jul. 28, 2022

(30) Foreign Application Priority Data
May 30, 2019   (JP) ................. 2019-101613

(51) Int. Cl.
*H02J 50/10*   (2016.01)
*F16S 5/00*   (2006.01)
(Continued)

(52) U.S. Cl.
CPC ............. *H02J 50/10* (2016.02); *G02B 5/208* (2013.01); *G02B 26/001* (2013.01);
(Continued)

(58) Field of Classification Search
CPC .......... H02J 50/10; H02J 50/40; G02B 5/208; G05D 16/2013; H01F 7/0215
(Continued)

(56) References Cited

U.S. PATENT DOCUMENTS 3,222,067 A * 12/1965 Litwhiler ............. A63B 71/022
473/421
3,749,380 A    7/1973 Strom
(Continued)

FOREIGN PATENT DOCUMENTS

CN   109061958 A   12/2018
EP   1267200 A1    12/2002
(Continued)

OTHER PUBLICATIONS

Alana Jo, "How To Build a Transport Cage for Show Rabbits", Bull Rock Barn and Home, Apr. 3, 2012, pp. 1-9, XP055925466.
(Continued)

*Primary Examiner* — Timothy J Thompson
*Assistant Examiner* — John B Freal
(74) *Attorney, Agent, or Firm* — Renner, Otto, Boisselle & Sklar, LLP

(57) ABSTRACT

A structural body includes: a three-dimensional net shaped body including a plurality of net lines that form a three-dimensional net shape; and a plurality of objects respectively present in two or more of a plurality of spaces partitioned by the plurality of net lines. The plurality of objects are each a mobile object that moves within one of the plurality of spaces or moves over two or more of the plurality of spaces.

13 Claims, 8 Drawing Sheets

(51) Int. Cl.
  *G02B 5/20* (2006.01)
  *G02B 26/00* (2006.01)
  *G05D 16/20* (2006.01)
  *H01F 7/02* (2006.01)
  *H01F 7/08* (2006.01)
  *H01F 7/14* (2006.01)
  *H02J 50/40* (2016.01)

(52) U.S. Cl.
  CPC ....... *G05D 16/2013* (2013.01); *H01F 7/0215* (2013.01); *H01F 7/081* (2013.01); *H01F 7/14* (2013.01); *H02J 50/40* (2016.02); *F16S 5/00* (2013.01)

(58) Field of Classification Search
  USPC ...................................................... 273/1.5 A
  See application file for complete search history.

(56) References Cited

U.S. PATENT DOCUMENTS

| | | | | |
|---|---|---|---|---|
| 4,013,292 A * | 3/1977 | Cohen | ................ | A63B 69/0071 |
| | | | | 273/371 |
| 4,074,905 A * | 2/1978 | High | ................... | A63B 47/025 |
| | | | | 473/421 |
| 4,660,830 A * | 4/1987 | Tomar | .................. | A63B 45/00 |
| | | | | 264/161 |
| 5,310,176 A * | 5/1994 | Berg | ................... | A63B 63/083 |
| | | | | 473/433 |
| 5,330,175 A * | 7/1994 | Kim | ................... | A63B 24/0021 |
| | | | | 273/402 |
| 5,706,738 A | 1/1998 | Rapeli | | |
| 6,152,126 A * | 11/2000 | Smith | ................... | A63B 69/406 |
| | | | | 124/78 |
| 7,351,168 B1 * | 4/2008 | Pannell | ................ | A63B 63/004 |
| | | | | 273/400 |
| 2010/0134872 A1 | 6/2010 | Johnson | | |
| 2012/0200910 A1 | 8/2012 | Hayashi | | |
| 2017/0182433 A1 | 6/2017 | de los Reyes | | |
| 2018/0070438 A1 * | 3/2018 | Yamauchi | .............. | G11B 5/484 |
| 2018/0222246 A1 | 8/2018 | Martin | | |
| 2018/0317600 A1 | 11/2018 | Campos | | |
| 2020/0073245 A1 | 3/2020 | Feng et al. | | |

FOREIGN PATENT DOCUMENTS

| | | |
|---|---|---|
| JP | 49-123888 U1 | 10/1974 |
| JP | 51-008756 B | 3/1976 |
| JP | 02-037397 Y | 10/1990 |
| JP | 4-111335 U1 | 9/1992 |
| JP | 05-345588 A | 12/1993 |
| JP | 08-509677 A | 10/1996 |
| JP | H09-135648 A | 5/1997 |
| JP | 2000-46106 A | 2/2000 |
| JP | 2002-365674 A | 12/2002 |
| JP | 2003-195772 A | 7/2003 |
| JP | 2004-045643 A | 2/2004 |
| JP | 2008-006234 A | 1/2008 |
| JP | 2008-213275 A | 9/2008 |
| JP | 2009-030198 A | 2/2009 |
| JP | 2010-510538 A | 4/2010 |
| JP | 2012-163894 A | 8/2012 |
| JP | 2015-93461 A | 5/2015 |
| JP | 2017-196756 A | 11/2017 |
| JP | 2018-536478 A | 12/2018 |
| WO | 9416937 A1 | 8/1994 |
| WO | 97/33267 A2 | 9/1997 |
| WO | 2008062336 A1 | 5/2008 |
| WO | 2017083697 A1 | 5/2017 |
| WO | 2018/144919 A1 | 8/2018 |

OTHER PUBLICATIONS

H. Lee et al., "Manipulation of biological cells using a microelectromagnet matrix", Applied Physics Letters, American Institute of Physics, 2 Huntington Quadrangle, Melville, NY 11747, vol. 85, No. 6, Jan. 2, 2004, pp. 1063-1065, XP012064149.
Extended European Search Report dated Jun. 13, 2022 corresponding to European Application No. 20813607.7.
Japanese Office Action corresponding to Japanese Application No. 2021-522211 dated May 17, 2022.
International Search Report for corresponding Application No. PCT/JP2020/019383, mailed Jul. 28, 2020.
Written Opinion for corresponding Application No. PCT/JP2020/019383, mailed Jul. 28, 2020.

* cited by examiner

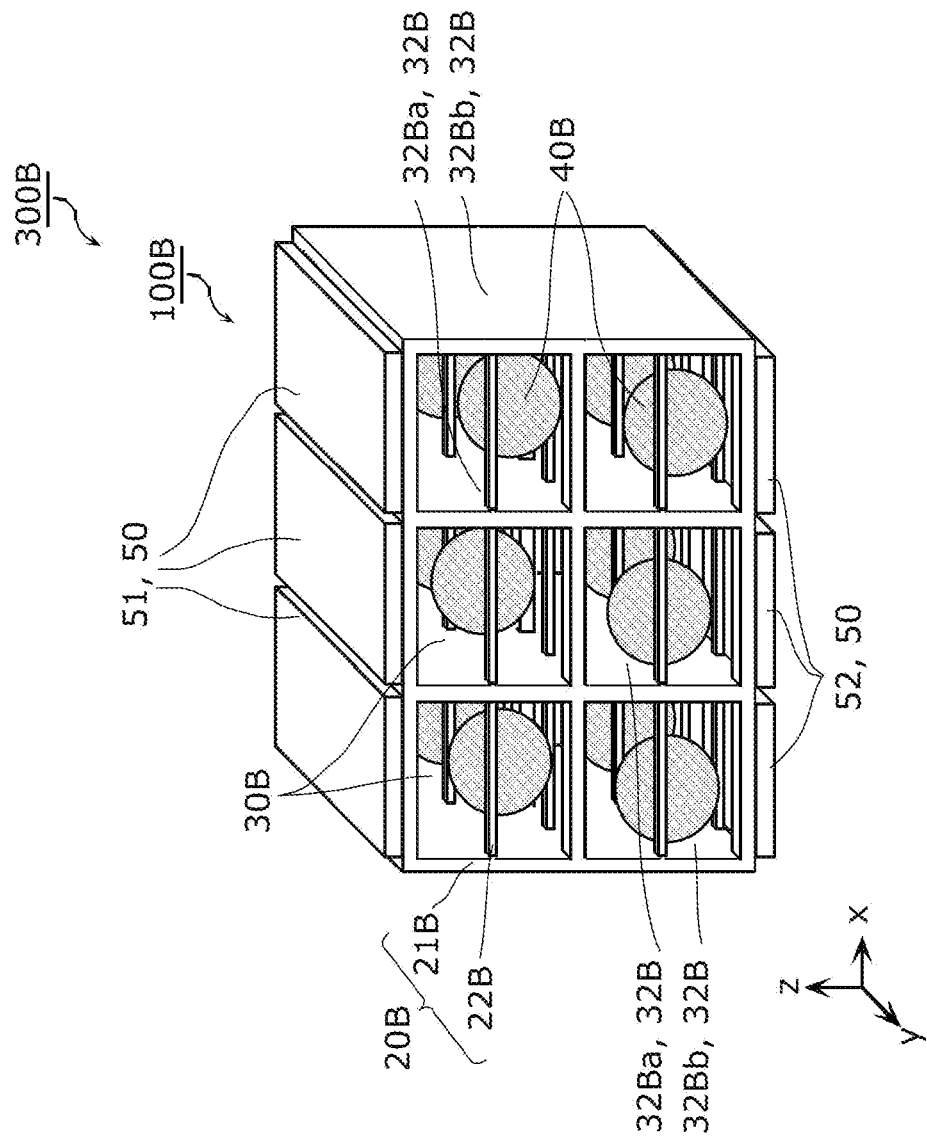

STRUCTURAL BODY, SYSTEM, AND STRUCTURAL PRODUCT

TECHNICAL FIELD

The present invention relates to a structural body, a system, and a structural product.

BACKGROUND ART

Conventionally, a structural body including a three-dimensional net shape as typified by a lattice structure, etc. has been used.

For example, Patent Literature (PTL) 1 discloses a technique that uses a lattice structure to control mechanical properties such as inhibition of a decrease in stiffness.

CITATION LIST

Patent Literature

[PTL 1] Japanese Unexamined Patent Application Publication No. 2015-93461

SUMMARY OF INVENTION

Technical Problem

For the structural body including the three-dimensional net shape, techniques of controlling mechanical properties have been mainly developed, whereas techniques for exerting a novel function other than the mechanical properties have not been focused on.

In view of the above, an object of the present invention is to provide a structural body that exerts a novel function, using a structural body including a three-dimensional net shape.

Solution to Problem

In order to achieve the above-described object, a structural body according to an aspect of the present invention includes: a three-dimensional net shaped body including a plurality of net lines that form a three-dimensional net shape; and a plurality of objects respectively present in two or more of a plurality of spaces partitioned by the plurality of net lines. In the structural body, the plurality of objects are each a mobile object that moves within one of the plurality of spaces or moves over two or more of the plurality of spaces.

In addition, a system according to an aspect of the present invention includes the above-described structural body; and an energy supply device that moves the plurality of objects by supplying energy to the plurality of objects.

In addition, a structural product according to an aspect of the present invention includes the above-described structural body.

Advantageous Effects of Invention

According to the present invention, it is possible to provide a structural body that exerts a novel function.

BRIEF DESCRIPTION OF DRAWINGS

FIG. 5A is a schematic diagram of a structural product according to Embodiment 3.

DESCRIPTION OF EMBODIMENTS

The following describes in detail a structural body according to an embodiment of the present disclosure, with reference to the drawings. It should be noted that each of the embodiments described below shows a specific example of the present invention. The numerical values, shapes, materials, structural components, the disposition and connection of the structural components, etc. described in the following embodiments are mere examples, and do not intend to limit the present invention. Among the structural components in the embodiments described below, those not recited in the independent claims will be described as optional structural components.

In addition, each diagram is a schematic diagram and not necessarily strictly illustrated. Accordingly, for example, scale sizes, etc. are not necessarily exactly represented. In each of the diagrams, substantially the same structural components are assigned with the same reference signs, and redundant descriptions will be omitted or simplified.

In addition, a term, such as "parallel" or "perpendicular", representing a relationship between the components as well as a term, such as "square" or "rectangle", representing a form, and a numerical range are used in the present description. Such terms and range are each not representing only a strict meaning of the term or range, but implying that a substantially same range, e.g., a range that includes even a difference as small as few percentages, is connoted in the term or range.

Furthermore, an x-axis, a y-axis, and a z-axis represent three axes of a three-dimensional orthogonal coordinate system in the Description and Drawings of the present application. In each of the embodiments, two axes parallel to one of boundary planes that define a plurality of spaces are an x-axis and a y-axis, and a direction perpendicular to the boundary plane is a z-axis direction.

Embodiment 1

Configuration

First, the configuration of system 1000 according to the present embodiment will be described with referenced to FIG. 1A and FIG. 1B.

Figure 1A:
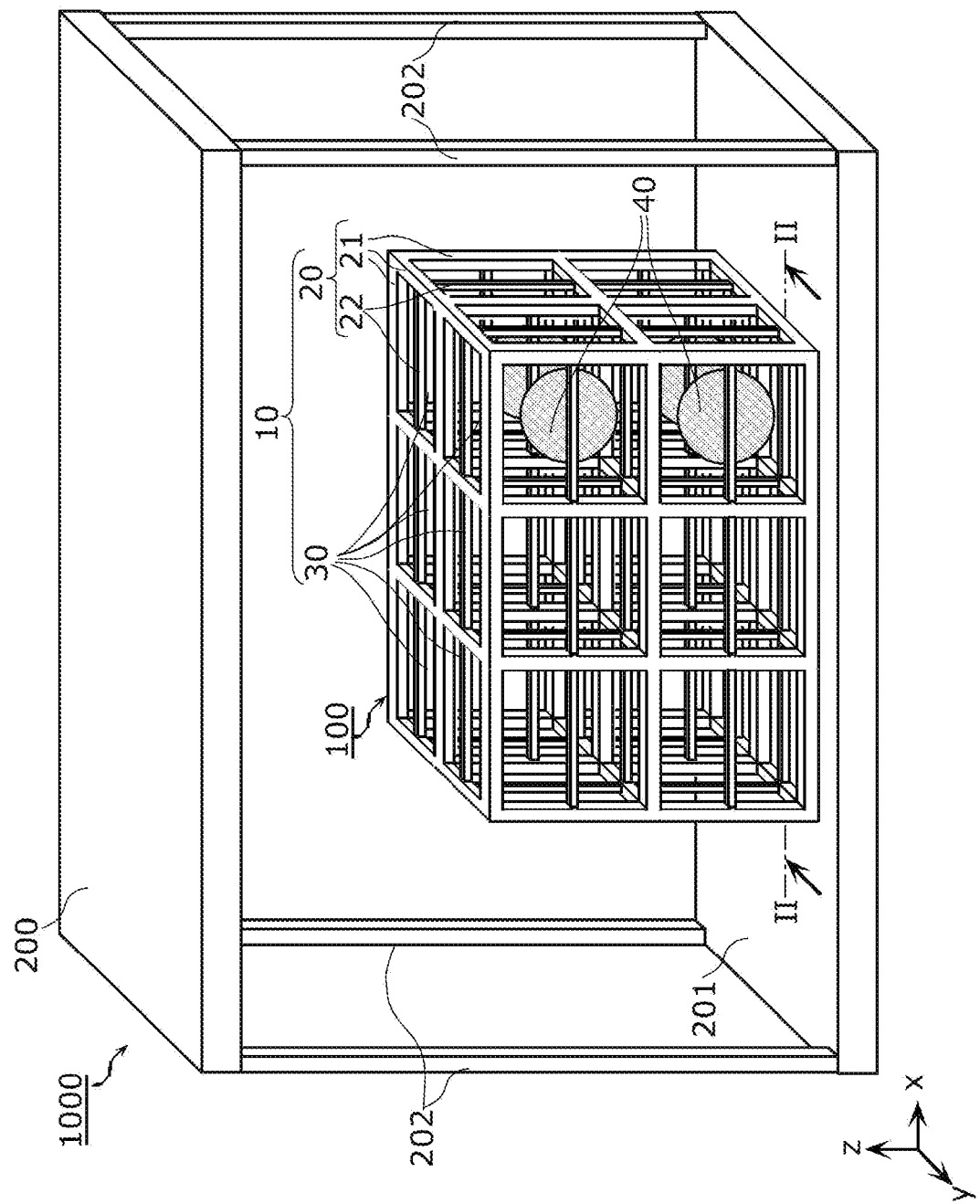
FIG. 1A is a schematic diagram of a system according to Embodiment 1.

FIG. 1A is a schematic diagram of system 1000 according to Embodiment 1. System 1000 according to the present embodiment is a system including structural body 100 and energy supply device 200. In addition, system 1000 according to the present embodiment includes mounting base 201 on which structural body 100 is mounted. Structural body 100 includes three-dimensional net shaped body 10 and a plurality of objects 40 which are mobile objects. Energy supply device 200 is a device that moves the plurality of objects 40 by supplying energy to the plurality of objects 40. For example, system 1000 is a system in which energy supply device 200 supplies energy to the plurality of objects 40 to move the plurality of objects 40, thereby causing structural body 100 to exert a novel function of structural body 100. System 1000 according to the present embodiment is a system in which, for example, energy supply device 200 supplies energy to the plurality of objects 40 to move the plurality of objects 40, thereby causing structural body 100 to rotate.

Energy supply device 200 according to the present embodiment is a device that includes an electromagnet. Energy supply device 200 according to the present embodiment includes, for example, a coil, a magnetic material on which the coil is wound, and a power supply that is connected to the coil. Energy supply device 200 according to the present embodiment is capable of generating a magnetic force and a magnetic field, as a result of a current flowing through the coil. The plurality of objects 40 are supplied with energy as a result of generation of the magnetic field by energy supply device 200 according to the present embodiment. Energy supply device 200 according to the present embodiment is located on the upper side (on the positive side of the z-axis) of structural body 100. Energy supply device 200 may be located on the upper side of structural body 100 and spaced apart from structural body 100 by column support 202 connected to mounting base 201.

Next, structural body 100 according to the present embodiment will be described. As described above, structural body 100 includes three-dimensional net shaped body 10 having a plurality of net lines 20, and objects 40 that are respectively present in two or more spaces 30 of a plurality of spaces 30 partitioned by the plurality of net lines 20. Structural body 100 according to the present embodiment is mounted, for example, on mounting base 201.

It should be noted that, although structural body 100 is located on the lower side (on the negative side of the z-axis) of energy supply device 200 according to the present embodiment, the positional relationship between structural body 100 and energy supply device 200 is not limited to this example. Furthermore, structural body 100 and energy supply device 200 may be in direct contact with each other. In other words, any positional relationship may be established as long as the plurality of objects 40 included in structural body 100 can receive energy that is supplied by energy supply device 200.

The plurality of net lines 20 included in three-dimensional net shaped body 10 are components that form the three-dimensional net shape. In addition, the plurality of net lines 20 are components that make up the framework of three-dimensional net shaped body 10. Although the plurality of net lines 20 form the three-dimensional net shape, it is not necessary that each of the plurality of net lines 20 is woven. For example, the plurality of net lines 20 may be shaped to branch off and extend from a portion of the plurality of net lines 20. In addition, for example, the plurality of net lines 20 may be shaped to be connected to one another.

Each of the plurality of net lines 20 according to the present embodiment has a shape of a straight line, but is not limited to this example. For example, each of the plurality of net lines 20 may have a curved shape, or a combination of a shape of a straight line and a curved shape. Each of the plurality of net lines 20 may have the same or different line thickness.

The plurality of net lines 20 according to the present embodiment includes a plurality of primary net lines 21 having a larger line thickness and a plurality of secondary net lines 22 having a smaller line thickness. According to the present embodiment, the line thickness of the plurality of primary net lines 21 is larger than the line thickness of the plurality of secondary net lines 22.

Each of the plurality of primary net lines 21 according to the present embodiment extends linearly in a direction along corresponding one of the x-axis, the y-axis, and the z-axis.

Among the plurality of primary net lines 21, lines extending in the x-axis direction are parallel to each other and evenly spaced. Among the plurality of primary net lines 21, lines extending in the y-axis direction are parallel to each other and evenly spaced. Among the plurality of primary net lines 21, lines extending in the z-axis direction are parallel to each other and evenly spaced.

In addition, according to the present embodiment, among the plurality of primary net lines 21, the lines extending in the x-axis direction, the lines extending in the y-axis direction, and the lines extending in the z-axis direction are arranged with the same spacing. It should be noted that, among the plurality of primary net lines 21, the lines extending in the x-axis direction, the lines extending in the y-axis direction, and the lines extending in the z-axis direction may be arranged with different spacing.

According to the configuration of the plurality of primary net lines 21 as described above, the plurality of primary net lines 21 are shaped in a three-dimensional lattice shape.

In addition, as will be described later, the plurality of spaces 30 according to the present embodiment each have a cubic shape. The plurality of spaces 30 are regions partitioned by the plurality of net lines 20, and thus the plurality of primary net lines 21 according to the present embodiment are arranged at positions corresponding to the respective sides of cubes (the plurality of spaces 30).

In regard to the plurality of secondary net lines 22 included in the plurality of net lines 20 according to the present embodiment, the details will be described with referenced to FIG. 1B.

The plurality of spaces 30 are regions partitioned by the plurality of net lines 20. In other words, the plurality of spaces 30 are three-dimensional regions partitioned by the plurality of net lines 20.

The plurality of spaces 30 according to the present embodiment are regions mainly partitioned by the plurality of primary net lines 21. However, the plurality of spaces 30 may be regions partitioned by the plurality of primary net lines 21 and the plurality of secondary net lines 22. In other words, the plurality of spaces 30 may have a shape resulting from combining the plurality of primary net lines 21 and the plurality of secondary net lines 22.

As described above, among the plurality of primary net lines 21, the lines extending in the x-axis direction, the lines extending in the y-axis direction, and the lines extending in the z-axis direction are arranged with the same spacing. Accordingly, the plurality of spaces 30 according to the present embodiment each have a cubic shape.

The shape of each of the plurality of spaces 30 is not limited to the cubic shape. For example, the shape of each of the plurality of spaces 30 may be any other shape such as a cuboid shape, a pyramidal shape, a prismatic shape, a conical shape, a cylindrical shape, a spherical shape, a regular polyhedral shape, etc., or a combination of these shapes. In addition, the plurality of spaces 30 may have respectively different shapes. Furthermore, the plurality of spaces 30 may have respectively different sizes. For example, the plurality of spaces 30 may be a combination of space 30 having a larger cubic shape and space 30 having a smaller cubic shape.

In addition, when the first direction, the second direction, and the third direction are directions perpendicular to one another, the plurality of spaces 30 are disposed along the first direction, the second direction, and the third direction. According to the present embodiment, for example, the x-axis direction is the first direction, the y-axis direction is the second direction, and the z-axis direction is the third direction. More specifically, among the plurality of spaces 30 according to the present embodiment, three are arranged in the x-axis direction, two are arranged in the y-axis direction, and two are arranged in the z-axis direction. It should be noted that the respective numbers of the plurality of spaces 30 arranged in the x-axis direction, in the y-axis direction, and in the z-axis direction are not limited to the above-described example.

As described above, three-dimensional net shaped body 10 includes the plurality of net lines 20. According to the present embodiment, the plurality of spaces 30 partitioned by the plurality of net lines 20 each have a cubic shape, and are respectively arranged in the x-axis direction, in the y-axis direction, and in the z-axis direction. As described above, three-dimensional net shaped body 10 has a configuration in which a three-dimensional lattice is continuously repeated. Accordingly, three-dimensional net shaped body 10 can be said also to be a lattice structure body. In addition, since three of the plurality of spaces 30 are arranged in the x-axis direction, two of the plurality of spaces 30 are arranged in the y-axis direction, and two of the plurality of spaces 30 are arranged in the z-axis direction, the shape of three-dimensional net shaped body 10 is a cuboid shape.

It should be noted that, when the shape of each of the plurality of spaces 30 is not a cubic shape unlike the above-described example, the shape of three-dimensional net shaped body 10 is also not a cuboid shape. The shape of three-dimensional net shaped body 10 may be any other shape such as a cuboid shape, a pyramidal shape, a prismatic shape, a conical shape, a cylindrical shape, a spherical shape, a regular polyhedral shape, etc.

In addition, three-dimensional net shaped body 10 according to the present embodiment has a high rigidity. Accordingly, even when a force is applied to three-dimensional net shaped body 10, the amount of deformation is quite small.

Object 40 is present in each of two or more spaces 30 of the plurality of spaces 30. In other words, in structural body 100 according to the present embodiment, there are two or more objects 40, i.e., the plurality of objects 40. The plurality of objects 40 are mobile objects that move. More specifically, the plurality of objects 40 each move within one space 30 of the plurality of spaces 30, and/or move over two or more spaces 30 of the plurality of spaces 30. The plurality of objects 40 according to the present embodiment each move within one space 30 of the plurality of spaces 30. In contrast, the plurality of objects 40 according to the present embodiment each do not move over two or more spaces 30 of the plurality of spaces 30.

In addition, according to the present embodiment, the plurality of objects 40 comprise four objects 40. Four objects 40 are respectively present in four spaces 30 located on the most positive side of the x-axis among the plurality of spaces 30. It should be noted that spaces 30 in which the plurality of objects 40 are present are not limited to the above-described example. The plurality of objects 40 are respectively present in two or more spaces 30 of the plurality of spaces 30, according to a function of structural body 100.

The plurality of objects 40 according to the present embodiment are solid substances. The plurality of objects 40 include at least one of a metallic material, an inorganic compound material, or an organic compound material. The metallic material, for example, may be a material including metal of a single type, or may be an alloy material including metal of two or more types. The inorganic compound material may be oxide, nitride, sulfide, halide, etc. The inorganic compound material may be a material derived from inorganic acid such as hydrochloric acid, nitric acid, phosphoric acid, sulfuric acid, carbonic acid, boracic acid, hydrofluoric acid, etc. The organic compound material may be a resin including a high polymer compound. According to the present embodiment, the plurality of objects 40 include a material that exhibits ferromagnetic properties, such as iron, cobalt, nickel, ferrite, or the like. More specifically, the plurality of objects 40 according to the present embodiment contain iron. For this reason, the plurality of objects 40 according to the present embodiment exhibit ferromagnetic properties.

The plurality of objects 40 according to the present embodiment each have a spherical shape. However, the shape of the plurality of objects 40 is not limited to this example. The shape of the plurality of objects 40 may be a cuboid shape, a pyramidal shape, a prismatic shape, a conical shape, a cylindrical shape, an ovoid shape, etc.

The shape of the plurality of objects 40 is a spherical shape, and thus the plurality of objects 40 do not have a corner or a protrusion. For this reason, it is possible to inhibit the plurality of objects 40 from being snagged inside the plurality of spaces 30, allowing the plurality of objects 40 to move smoothly inside the plurality of spaces 30.

Next, boundary plane 31 included in the plurality of spaces 30 and the plurality of secondary net lines 22 will be described in detail with referenced to FIG. 1B.

Figure 1B:
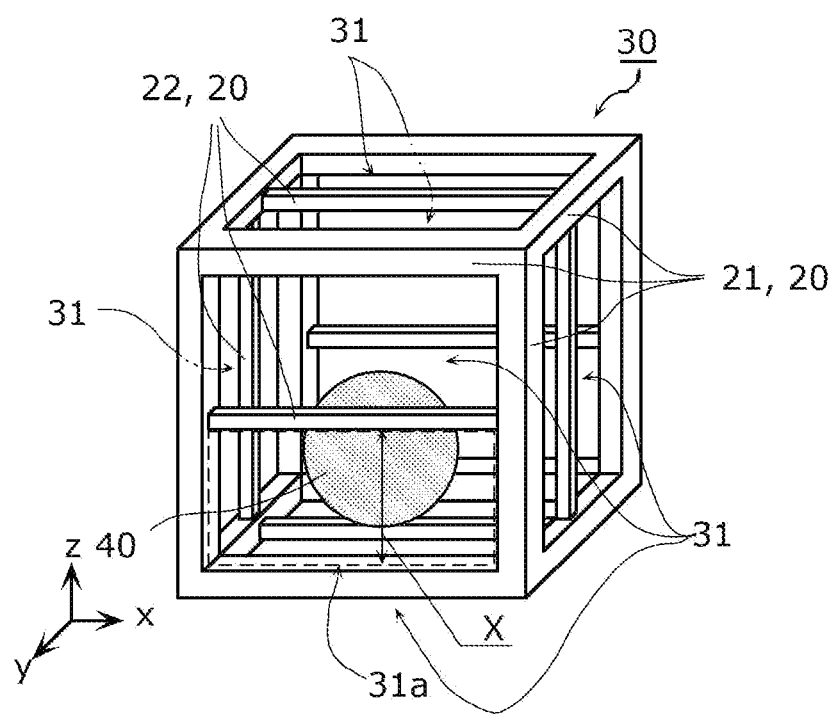
FIG. 1B is an enlarged perspective view of one space which is one of a plurality of spaces according to Embodiment 1.

FIG. 1B is an enlarged perspective view of space 30 which is one of the plurality of spaces 30 according to Embodiment 1.

The plurality of spaces 30 according to the present embodiment include boundary plane 31 that defines the plurality of spaces 30. Boundary plane 31 is a two-dimensional region sectioned by the plurality of net lines 20 in the plurality of spaces 30 including this boundary plane 31. Since each of the plurality of spaces 30 according to the present embodiment has a cubic shape, each of the plurality of spaces 30 according to the present embodiment includes six boundary planes 31. Boundary planes 31 include a plane that is an interface between two adjacent spaces 30 among the plurality of spaces 30. In addition, one or more of boundary planes 31 are included in outermost planes located outermost of three-dimensional net shaped body 10. As described above, since three-dimensional net shaped body 10 has a cuboid shape, the outermost planes are six planes that define the cuboid shape. In addition, according to the present embodiment, one of the outermost surfaces is a surface at which structural body 100 and mounting base 201 are in contact with each other.

Next, the plurality of secondary net lines 22 will be described.

Each of the plurality of secondary net lines 22 according to the present embodiment extends linearly in a direction along corresponding one of the x-axis and the z-axis.

Among the plurality of secondary net lines 22, those extending in the x-axis direction are each located at the center between adjacent ones of the plurality of primary net lines 21 which extend in the x-axis direction. According to the present embodiment, those extending in the x-axis direction among the plurality of secondary net lines 22 are located on boundary planes 31 parallel to the xy plane and on boundary planes 31 parallel to the xz plane.

Among the plurality of secondary net lines 22, those extending in the z-axis direction are each located at the center between adjacent ones of the plurality of primary net lines 21 which extend in the z-axis direction. According to the present embodiment, those extending in the z-axis direction among the plurality of secondary net lines 22 are located on boundary planes 31 parallel to the yz plane.

In addition, on boundary planes 31, opening portions 31a enclosed by the plurality of primary net lines 21 and the plurality of secondary net lines 22 are present. Whether the plurality of objects 40 move over two or more spaces 30 of the plurality of spaces 30 depends on the size of opening portions 31a. In other words, as opening portions 31a increase in size, the plurality of objects 40 more likely to move over two or more spaces 30 of the plurality of spaces 30. On the other hand, as opening portions 31a decrease in size, the plurality of objects 40 less likely to move over two or more spaces 30 of the plurality of spaces 30.

As illustrated in FIG. 1B, according to the present embodiment, opening portions 31a each have a rectangular shape. In FIG. 1B, opening portion 31a is indicated by dotted lines defining a quadrilateral shape. In addition, according to the present embodiment, when the length of opening portion 31a in the crosswise direction is denoted as X, X is shorter than the diameter of each of the plurality of objects 40 having a spherical shape. The plurality of primary net lines 21 and the plurality of secondary net lines 22 included in the plurality of net lines 20 according to the present embodiment are arranged in a positional relationship as described above.

Accordingly, in the present embodiment, the plurality of objects 40 and the plurality of net lines 20 have a configuration that prevents the plurality of objects 40 from moving over two or more of the plurality of spaces 30.

According to this configuration, the plurality of objects 40 are capable of staying within one of the plurality of spaces 30.

It should be noted that, one secondary net line 22 is provided on one boundary plane 31 according to the present embodiment, but the present invention is not limited to this example. For example, two or more secondary net lines 22 may be disposed on one boundary plane 31. In addition, in the case where two or more secondary net lines 22 are disposed on one boundary plane 31, the two or more secondary net lines 22 need not necessarily be parallel to each other. For example, the two or more secondary net lines 22 may intersect with each other in a cross shape or in a mesh shape.

Structural body 100 according to the present embodiment has a configuration as described above. Here, a manufacturing method of structural body 100 according to the present embodiment will be described.

Manufacturing Method

First, a method of manufacturing three-dimensional net shaped body 10 included in structural body 100 according to the present embodiment will be described.

Three-dimensional net shaped body 10 can be manufactured using a three-dimensional (3D) printer (additive manufacturing). In other words, the plurality of net lines 20 included in three-dimensional net shaped body 10 can be manufactured using a 3D printer. 3D printers laminate a plurality of layers using three-dimensional computer data that represents a three-dimensional manufacturing target that is desired to be manufactured, thereby manufacturing the three-dimensional manufacturing target. Manufacturing methods that use 3D printers include, for example, a material extrusion method, a liquid tank photopolymerization method, a material injection method, a binder injection method, a powder bed melt bonding method, etc.

According to the present embodiment, three-dimensional net shaped body 10 is manufactured using the material extrusion method. The material extrusion method is carried out according to the procedure described below.

First, a filament fused material is obtained by fusing a filament. Three-dimensional net shaped body 10 is configured using this filament. Next, the filament fused material is discharged from a nozzle to a predetermined position of a manufacturing stage, based on three-dimensional computer data. Layers of the filament fused material are laminated as a result of repeating the process of discharging the filament fused material, and thereby the three-dimensional manufacturing target that is desired to be manufactured can be obtained. Alternatively, the three-dimensional manufacturing target that is desired to be manufactured may be obtained as a result of removing a water-soluble supporting material after the manufacturing.

In addition, it is sufficient if the filament has a thermal fusion property. For example, the filament may be made including a thermoplastic resin and a filler (filling agent). The filler may be a material that contains a metallic powder, a wood powder, or a phosphorescent material. In addition, since the filler can be combined with a resin to provide the resin with a new property, the filler is selected according to the application.

According to the present embodiment, three-dimensional net shaped body 10 and the plurality of net lines 20 are manufactured using an acrylonitrile-butadiene-styrene (ABS) resin material as a filament. It should be noted that, since the ABS resin material is a material having a high rigidity according to the present embodiment, three-dimensional net shaped body 10 has a high rigidity.

Next, the plurality of objects 40 according to the present embodiment will be described. According to the present embodiment, the plurality of objects 40 are disposed to be present in the plurality of spaces 30 in the middle of the manufacturing of three-dimensional net shaped body 10. In other words, the manufacturing of three-dimensional net shaped body 10 is suspended in the middle of the laminating of layers, and the manufacturing of three-dimensional net shaped body 10 is started again after the plurality of objects 40 are disposed.

Structural body 100 according to the present embodiment is manufacture through the manufacturing method as described above.

The following describes the behavior of structural body 100 when energy supply device 200 generates a magnetic field.

Behavior at the Time of Magnetic Field Generation

Figure 2:
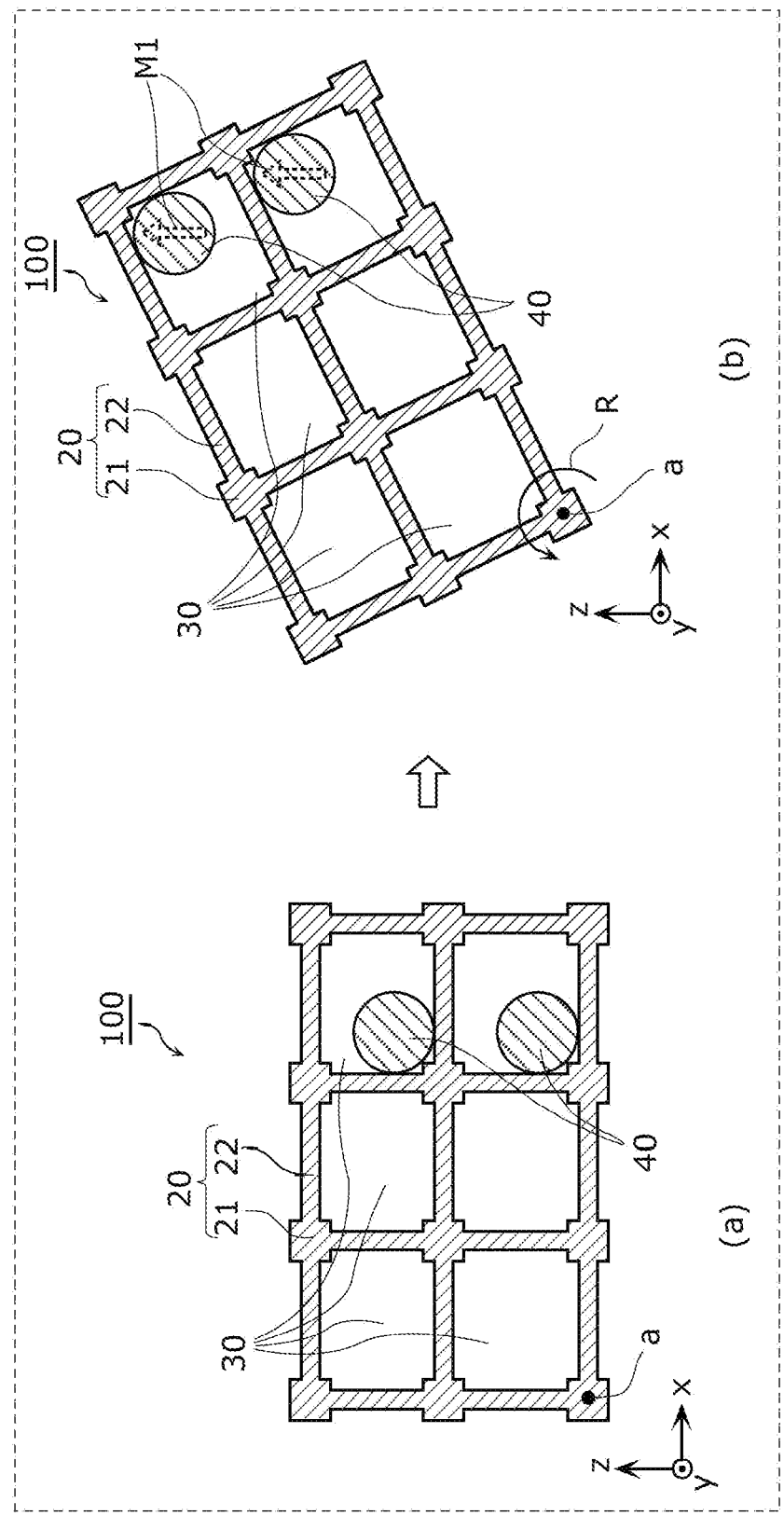
FIG. 2 is a cross-sectional view of a structural body taken along the line II-II of FIG. 1A.

FIG. 2 is a cross-sectional view of structural body 100 taken along the line II-II illustrated in FIG. 1A. More specifically, FIG. 2 is a diagram which illustrates the behavior of structural body 100 at the time when a magnetic field is generated by energy supply device 200, and magnetic force M1 acts on the plurality of objects 40, in system 1000 according to the present embodiment. FIG. 2 illustrates in (a) a cross-sectional view of structural body 100 before magnetic force M1 is generated, and in (b) a cross-sectional view of structural body 100 after magnetic force M1 is generated. In addition, in order to prevent the diagram from being complicated, energy supply device 200, mounting base 201, and column support 202 are not illustrated in FIG. 2.

In structural body 100 according to the present embodiment, the plurality of objects 40 are present in spaces 30 that are located on the most positive side of the x-axis among the plurality of spaces 30, as described above.

In addition, structural body 100 according to the present embodiment includes axis a. Axis a is a linear axis located at the center of one of the plurality of primary net lines 21 that are located on the most negative side of the x-axis and the most negative side of the z-axis, and extending in the y-axis direction. Axis a is immovable from the position to which axis a is fixed. According to the configuration as described above, structural body 100 according to the present embodiment is fixed rotatably about axis a.

In addition, energy supply device 200 according to the present embodiment is a device that includes an electromagnet, and generates a magnetic field.

As illustrated in (a) in FIG. 2, structural body 100 remains stationary prior to the generation of the magnetic field; that is, prior to the generation of magnetic force M1.

Meanwhile, as illustrated in (b) in FIG. 2, subsequent to the generation of the magnetic field, i.e., subsequent to the generation of magnetic force M1, structural body 100 moves in a rotational motion in rotation direction R about axis a as an axis of rotation. This phenomenon is explained by the following mechanism.

The plurality of objects 40 according to the present embodiment exhibit ferromagnetic properties. For that reason, each of the plurality of objects 40 is magnetized by the magnetic field.

Furthermore, magnetic force M1 that is attracted to the electromagnet included in energy supply device 200 acts on the plurality of objects 40. According to the present embodiment, since energy supply device 200 is located above structural body 100 (on the positive side of the z-axis), the direction of magnetic force M1 is the positive direction of the z-axis. According to this configuration, the plurality of objects 40 each move within one space 30 of the plurality of spaces 30. As a result of the plurality of objects 40 moving, the plurality of objects 40 come into contact with the plurality of net lines 20 and press the plurality of net lines 20 in the direction of magnetic force M1. This gives structural body 100 a force to move in the direction of magnetic force M1, in the same manner as the plurality of objects 40. Meanwhile, structural body 100 is fixed rotatably about axis a. For that reason, structural body 100 moves in a rotational motion in rotation direction R about axis a as an axis of rotation.

According to the configuration as described above, structural body 100 is caused to exert a novel function of structural body 100, as a result of the plurality of objects 40 moving. According to the present embodiment, structural body 100 moves in a rotational motion as a result of the plurality of objects 40 moving. In other words, the novel function is the function of the rotational motion of structural body 100, according to the present embodiment. In addition, according to the present embodiment, the plurality of spaces 30 are regions sectioned by the plurality of net lines 20 included in three-dimensional net shaped body 10, and the plurality of objects 40 are respectively present in two or more spaces 30 of the plurality of spaces 30, according to the function of structural body 100. In other words, the plurality of objects 40 are present in the plurality of spaces 30 that are most suitable according to the function of structure 100. For that reason, structural body 100 is capable of exerting, to a maximum extent, the function of structural body 100.

In addition, system 1000 according to the present embodiment includes structural body 100 and energy supply device 200 that moves the plurality of objects 40 by supplying energy to the plurality of objects 40.

According to this configuration, system 1000 according to the present embodiment is capable of readily moving the plurality of objects 40. Thus, as a result, structural body 100 according to the present embodiment readily exerts the novel function of structural body 100.

The plurality of objects 40 each move within one space 30 of the plurality of spaces 30 according to the present embodiment, but are not limited to this example. The plurality of objects 40 may move over two or more spaces 30 of the plurality of spaces 30. In this case as well, when the magnetic field is generated, the plurality of objects 40 come into contact with the plurality of net lines 20 and press the plurality of net lines 20 in the direction of magnetic force M1.

Structural body 100 according to the present embodiment includes axis a, but is not limited to this example. When structural body 100 does not include axis a; that is, when structural body 100 is not fixed rotatably, structural body 100 moves according to the direction of magnetic force M1. In other word, in this case, the novel function is a function of structural body 100 moving.

One object 40 is present in one space 30 according to the present embodiment, but the present invention is not limited to this example. For example, the plurality of objects 40 may include a first object and a second object, and the first object and the second object may be present in one space 30 of the plurality of spaces 30. In other words, two objects 40 may be present in one space 30. In addition, two or more objects 40 may be present in one space 30.

According to this configuration, structural body 100 is capable of including more objects 40. As a result, the force with which the plurality of objects 40 press the plurality of net lines 20 in the direction of magnetic force M1 increases. In other words, structural body 100 is more likely to exhibit the novel function of structural body 100.

Advantageous Effect, Etc.

As described above, structural body 100 according to the present embodiment includes three-dimensional net shaped body 10 that includes the plurality of net lines 20 that form the three-dimensional net shape. In addition, structural body 100 according to the present embodiment includes objects 40 that are respectively present in two or more spaces 30 of the plurality of spaces 30 partitioned by the plurality of net lines 20. The plurality of objects 40 are each a mobile object that moves within one space 30 of the plurality of spaces 30, and/or moves over two or more spaces 30 of the plurality of spaces 30.

According to the above-described configuration, structural body 100 is caused to exert a novel function of structural body 100, as a result of the plurality of objects 40 moving. According to the present embodiment, structural body 100 moves in a rotational motion as a result of the plurality of objects 40 moving. In other words, the novel function is the function of the rotational motion of structural body 100, according to the present embodiment. In addition, according to the present embodiment, the plurality of spaces 30 are regions sectioned by the plurality of net lines 20 included in three-dimensional net shaped body 10, and the plurality of objects 40 are respectively present in two or more spaces 30 of the plurality of spaces 30, according to the function of structural body 100. In other words, the plurality of objects 40 are present in the plurality of spaces 30 that are most suitable according to the function of structure 100. For that reason, structural body 100 is capable of exerting, to a maximum extent, the function of structural body 100.

In addition, in structural body 100 according to the present embodiment, the plurality of objects 40 and the plurality of net lines 20 have a configuration that prevents the plurality of objects 40 from moving over two or more of the plurality of spaces 30.

According to the above-described configuration, the plurality of objects 40 are capable of staying within one of the plurality of spaces 30.

In addition, in structural body 100 according to the present embodiment, the plurality of objects 40 include a first object and a second object, and the first object and the second object are present in one space 30 of the plurality of spaces 30.

According to the above-described configuration, structural body 100 is capable of including more objects 40. As a result, the force with which the plurality of objects 40 press the plurality of net lines 20 in the direction of magnetic force M1 increases. In other words, structural body 100 is more likely to exhibit the novel function of structural body 100.

In addition, in structural body 100 according to the present embodiment, the plurality of objects 40 each have a spherical shape.

According to the above-described configuration, the shape of each of the plurality of objects 40 does not have a corner or a protrusion. For this reason, it is possible to inhibit the plurality of objects 40 from being snagged inside the plurality of spaces 30, allowing the plurality of objects 40 to move smoothly inside the plurality of spaces 30.

In addition, system 1000 according to the present embodiment includes the above-described structural body 100 and energy supply device 200 that moves the plurality of objects 40 by supplying energy to the plurality of objects 40.

According to the above-described configuration, system 1000 is capable of readily moving the plurality of objects 40. Thus, as a result, structural body 100 according to the present embodiment readily exerts the novel function of structural body 100.

Embodiment 2

Although the configuration in which the plurality of objects 40 are present in some of the plurality of spaces 30 has been described in Embodiment 1, the configuration is not limited to this example. Embodiment 2 is different from Embodiment 1 in that at least one of the plurality of objects 40A is present in each of a plurality of spaces 30A. It should be noted that, in Embodiment 2, the detailed description of the structural components common to Embodiment 1 will be omitted.

Configuration

Figure 3:
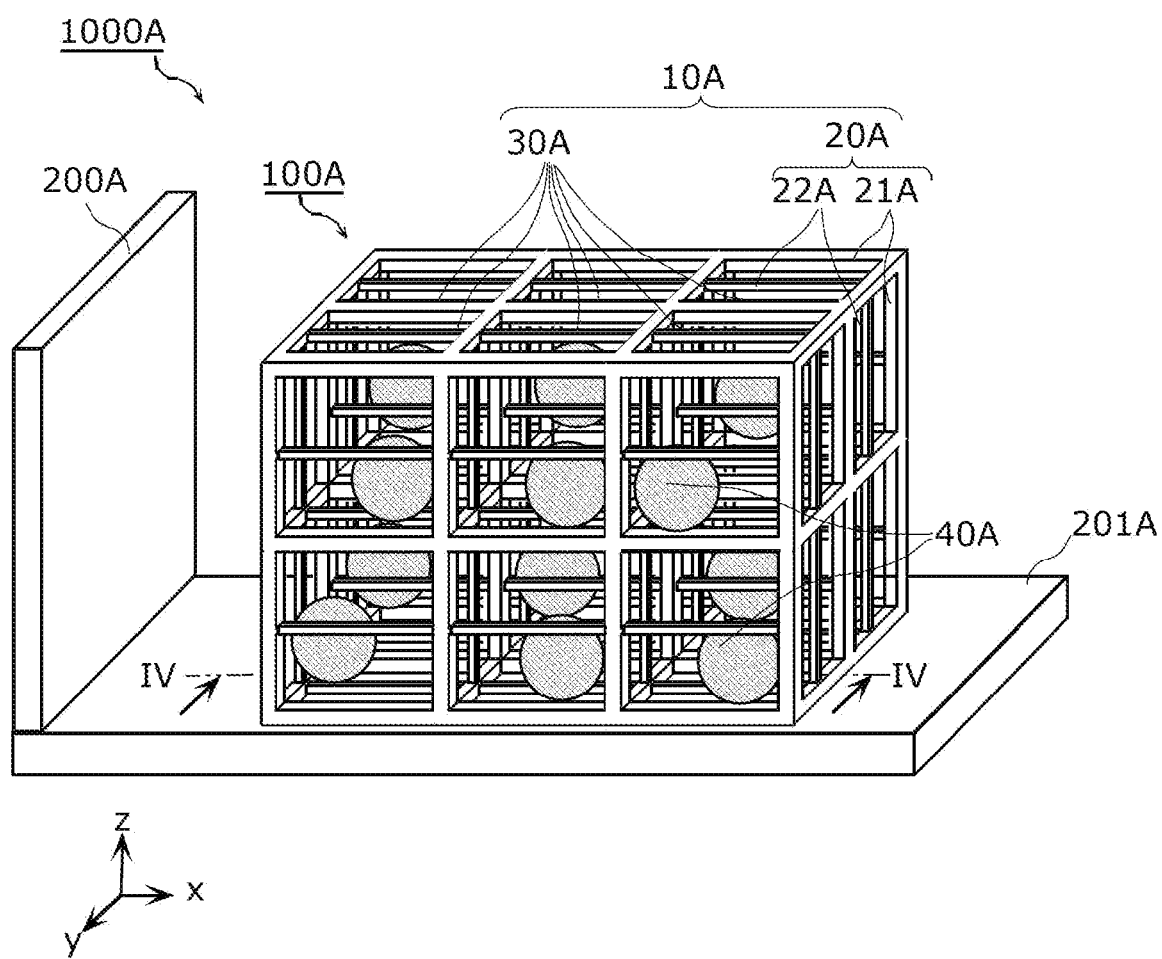
FIG. 3 is a schematic diagram of a system according to Embodiment 2.

First, the configuration of system 1000A according to the present embodiment will be described with referenced to FIG. 3. FIG. 3 is a schematic diagram of system 1000A according to Embodiment 2.

System 1000A according to the present embodiment is a system including structural body 100A and energy supply device 200A. In addition, system 1000A according to the present embodiment includes mounting base 201A on which structural body 100A is mounted. Structural body 100A includes three-dimensional net shaped body 10A and a plurality of objects 40A which are mobile objects. Energy supply device 200A is a device that moves the plurality of objects 40A by supplying energy to the plurality of objects 40A. Energy supply device 200A according to the present embodiment is a device that includes an electromagnet as with Embodiment 1, and is disposed on the negative side of the x-axis with respect to structural body 100A.

For example, system 1000A is a system in which energy supply device 200A supplies energy to the plurality of objects 40A to move the plurality of objects 40A, thereby causing structural body 100A to exert a novel function of structural body 100A. According to the present embodiment, system 1000A is a system in which energy supply device 200A supplies energy to the plurality of objects 40A to move the plurality of objects 40A, thereby controlling the properties of structural body 100A. In other words, system 1000A controls, as a result of the plurality of objects 40A moving, one or more of the properties of structural body 100A which include an optical property, an electrical conduction property, a thermal conductive property, and a fluid resistance property. According to the present embodiment, system 1000A is a system that controls the optical property of structural body 100A.

In addition, three-dimensional net shaped body 10A includes the plurality of net lines 20A. The plurality of net lines 20A include a plurality of primary net lines 21A and a plurality of secondary net lines 22A. The plurality of spaces 30A are regions sectioned by the plurality of net lines 20A. It should be noted that the three-dimensional net shaped body 10A, the plurality of net lines 20A, the plurality of spaces 30A, the plurality of primary net lines 21A, and the plurality of secondary net lines 22A are the same in configuration as Embodiment 1.

Unlike structural body 100 described in Embodiment 1, structural body 100A according to the present embodiment does not have axis a, and is fixed to a predetermined position.

According to the present embodiment, the plurality of objects 40A are present in all of the plurality of spaces 30A. In other words, at least one object 40A is present in each space 30A of the plurality of spaces 30A.

The plurality of objects 40A may exhibit the property of controlling light. For example, the plurality of objects 40A may exhibit the property of absorbing, reflecting, or transmitting light. In addition, the plurality of objects 40A may exhibit the property of controlling light as described above, and may further exhibit ferromagnetic property as described in Embodiment 1. For that reason, the plurality of objects 40A may include two or more different materials.

The plurality of objects 40A according to the present embodiment are configured to have a core-shell structure. The core-shell structure is a structure that includes two or more materials, in which one material forms a core and the other material forms a layer (shell) that surrounds the periphery of the core. According to the present embodiment, the core of each of the plurality of objects 40A includes iron, as with Embodiment 1, and the shell of each of the plurality of objects 40A includes a material having a high light absorptivity. More specifically, the shell of each of the plurality of objects 40A includes a black material having a high visible light absorptivity. The black material is carbon black, for example. With such a configuration as described above, the plurality of objects 40A exhibit the ferromagnetic property and further, absorb visible light. It should be noted that the black material is not limited to carbon black, but may be black pigment or black dye, for example, metal oxide.

The following describes the behavior of structural body 100A when energy supply device 200A generates a magnetic field.

Behavior at the time of Magnetic Field Generation

Figure 4:
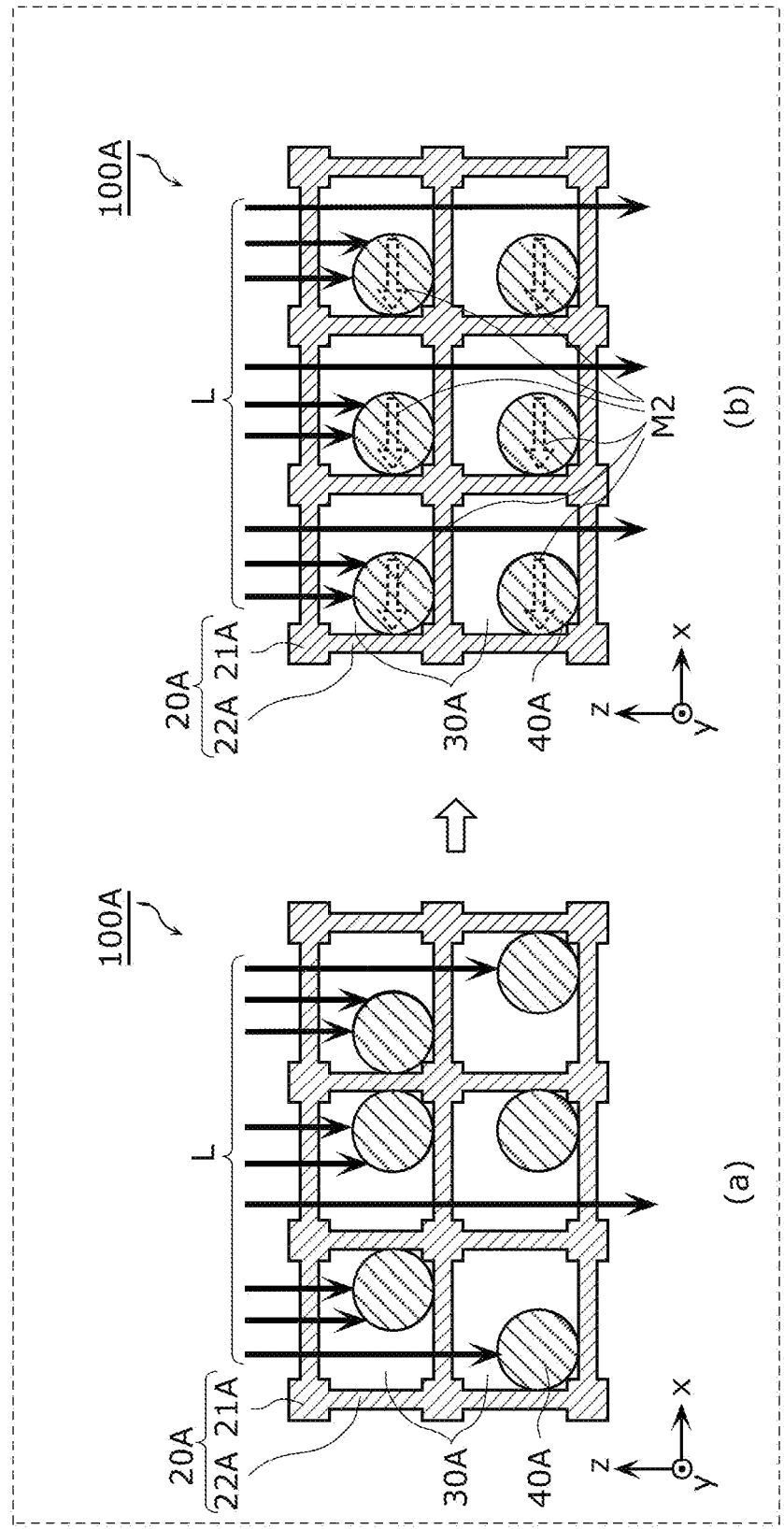
FIG. 4 is a cross-sectional view of a structural body taken along the line IV-IV of FIG. 3.

FIG. 4 is a cross-sectional view of structural body 100A taken along the line IV-IV illustrated in FIG. 3. More specifically, FIG. 4 is a diagram which illustrates the behavior of structural body 100A at the time when a magnetic field is generated by energy supply device 200A, and magnetic force M2 acts on the plurality of objects 40A, in system 1000A according to the present embodiment. FIG. 4 illustrates in (a) a cross-sectional view of structural body 100A before magnetic force M2 is generated, and in (b) a cross-sectional view of structural body 100A after magnetic force M2 is generated. In addition, in order to prevent the diagram from being complicated, energy supply device 200A and mounting base 201A are not illustrated in FIG. 4.

Energy supply device 200A according to the present embodiment is a device that includes an electromagnet, and generates a magnetic field, as with Embodiment 1.

As illustrated in (a) in FIG. 4, prior to the generation of the magnetic field; that is, prior to the generation of magnetic force M2, the plurality of objects 40A are present respectively in the plurality of spaces 30A at random positions.

Here, it is assumed that light L is emitted to structural body 100A. Light L is light that travels straight in the negative direction of the z-axis and is white light that consists of wavelengths in the visible light region. As described above, the plurality of objects 40A according to the present embodiment absorb visible light. Accordingly, the light incident on the plurality of objects 40A out of light L is absorbed by the plurality of objects 40A and is quenched. Thus, the light incident on the plurality of objects 40A out of light L cannot pass through structure 100A. In other words, the light transmittance of structural body 100A before the magnetic field is generated is low.

On the other hand, as illustrated in (b) in FIG. 4, after the magnetic field is generated; that is, after magnetic force M2 is generated, structural body 100A transmits a larger amount of light L. In other words, the light transmittance of structural body 100A after the magnetic field is generated is high. This phenomenon is explained by the following mechanism.

The plurality of objects 40A according to the present embodiment exhibit ferromagnetic properties. For that reason, the plurality of objects 40A are magnetized by the magnetic field. Furthermore, magnetic force M2 that is attracted to the electromagnet included in energy supply device 200A acts on the plurality of objects 40A. According to the present embodiment, since energy supply device 200A is located on the negative side of the x-axis of structural body 100A, the direction of magnetic force M2 is the negative direction of the x-axis. According to this configuration, the plurality of objects 40A respectively move within one space 30A of the plurality of spaces 30A. As a result of the plurality of objects 40A moving, the plurality of objects 40A are each located on the negative side of the x-axis in each of the plurality of spaces 30A.

As a result, when structural body 100A is viewed in the direction of travel of light L (the negative direction of the z-axis), the plurality of objects 40A are positioned such that the plurality of objects 40A overlap. Thus, as a result of the generation of magnetic force M2 (i.e., as a result of changing of the state from (a) to (b) in FIG. 4), the light incident on the plurality of objects 40A out of light L is reduced. In other words, the light transmittance of structural body 100A after magnetic force M2 is generated is high. Accordingly, system 1000A according to the present embodiment can be used as a light transmittance control device that controls the transmittance of light.

According to the configuration as described above, structural body 100A exhibits the novel function of the plurality of objects 40A, as a result of the plurality of objects 40A moving. According to the present embodiment, as a result of the plurality of objects 40A moving, it is possible to control the light transmission property that is one of the optical properties of structural body 100A. In other words, according to the present embodiment, the novel function is the function of controlling the light transmission property of structural body 100A. In addition, system 1000A that includes structural body 100A as described above can be used as a light transmittance control device that controls the light transmittance.

According to the present embodiment, at least one of the plurality of objects 40A is present in each of the plurality of spaces 30A.

According to this configuration, structural body 100A is capable of including more objects 40A. Therefore, before the magnetic field is generated, a larger amount of light L is absorbed and quenched by the plurality of objects 40A. In other words, it is possible to further reduce the light transmittance of structural body 100A before the magnetic field is generated. As a result, it is possible to further readily control the light transmission property that is one of the optical properties of structural body 100A.

In addition, according to the present embodiment, when the first direction, the second direction, and the third direction are directions perpendicular to one another, the plurality of spaces 30A are disposed along the first direction, the second direction, and the third direction. According to the present embodiment, for example, the x-axis direction is the first direction, the y-axis direction is the second direction, and the z-axis direction is the third direction. More specifically, among the plurality of spaces 30A according to the present embodiment, three are arranged in the x-axis direction, two are arranged in the y-axis direction, and two are arranged in the z-axis direction. Thus, the plurality of spaces 30A are arranged in the same manner as the plurality of spaces 30 according to Embodiment 1.

According to this configuration, it is possible to arrange the plurality of spaces 30A of structural body 100A so as to overlap in the first direction, the second direction, and the third direction. Accordingly, structural body 100A is capable of including more objects 40A. Therefore, before the magnetic field is generated, a larger amount of light L is absorbed and quenched by the plurality of objects 40A. In other words, it is possible to further reduce the light transmittance of structural body 100A before the magnetic field is generated. As a result, it is possible to further readily control the light transmission property that is one of the optical properties of structural body 100A.

Embodiment 3

Although the plurality of objects 40 and 40A are supplied with energy by energy supply devices 200 and 200A in system 1000 and system 1000A according to Embodiment 1 and Embodiment 2, the present invention is not limited to this example. In addition, Embodiment 3 is different from Embodiments 1 and 2 in that the three-dimensional net shaped body is an elastic body that deforms elastically. Furthermore, Embodiment 3 is different from Embodiments 1 and 2 in that structural body 100B includes partition wall 32B. It should be noted that, in Embodiment 3, the detailed description of the structural components common to Embodiment 1 or Embodiment 2 will be omitted.

Configuration

First, the configuration of structural product 300B according to the present embodiment will be described with referenced to FIG. 5A and FIG. 5B.

FIG. 5A is a schematic diagram of structural product 300B according to Embodiment 3. Structural product 300B is a device that controls at least one of the optical property, the electrical conduction property, the thermal conductive property, or the fluid resistance property of structural body 100B, as a result of the plurality of objects 40B moving in the plurality of spaces 30B.

Structural product 300B according to the present embodiment is a device that includes structural body 100B and contact point 50. Contact point 50 includes contact point 51 and contact point 52 which are paired with each other. According to the present embodiment, structural product 300B is an electronic device that controls the electrical conduction property of structural body 100B.

Structural product 300B according to the present embodiment can be used as a sensor for sensing the flow of current between contact point 51 and contact point 52 which are paired with each other. It should be noted that, according to the present embodiment, the combination of contact point 51 and contact point 52 facing each other across structural product 300B is one pair. In other words, According to the present embodiment, there are three combinations of contact point 51 and contact point 52.

For that reason, contact point 51 and contact point 52 which are paired with each other are electrically connected to a power supply device for applying a voltage and a current measurement device for measuring a current value. However, in FIG. 5A, the power supply device and the current measurement device are not illustrated in order to prevent the diagram from being complicated.

In addition, structural body 100B includes a three-dimensional net shaped body, a plurality of objects 40B that are mobile objects, and partition wall 32B that restricts the movement of the plurality of objects 40B. The three-dimensional net shaped body includes a plurality of net lines 20B. The plurality of net lines 20B include a plurality of primary net lines 21B and a plurality of secondary net lines 22B. The plurality of spaces 30B are regions sectioned by the plurality of net lines 20B.

First, partition wall 32B and the plurality of objects 40B according to the present embodiment will be described.

As described above, structural body 100B according to the present embodiment includes partition wall 32B that restricts the movement of the plurality of objects 40B. Partition wall 32B is provided on a boundary plane. In addition, partition wall 32B is provided on the entirety of one or more planes of the outermost planes. In other words, according to the present embodiment, partition wall 32B is provided on the plane that is the interface between two adjacent spaces 30B among the plurality of spaces 30B, and on the entirety of one or more of the outermost planes. In addition, partition wall 32B according to the present embodiment includes partition wall 32Ba provided on the plane that is the interface between two adjacent spaces 30B among the plurality of spaces 30B, and partition wall 32Bb provided on the entirety of one or more of the outermost planes.

In this manner, partition wall 32B is provided to inhibit the plurality of objects 40B from moving over two or more of the plurality of spaces 30B. Accordingly, the plurality of objects 40B are capable of staying within one of the plurality of spaces 30B. Furthermore, it is possible to inhibit the plurality of objects 40B from exiting the three-dimensional net shaped body.

The plurality of objects 40B according to the present embodiment include a material that exhibits high electrical conductivity. More specifically, the surface of the plurality of objects 40B is covered with copper which is a material that exhibits a high electrical conduction property. For that reason, the plurality of objects 40B exhibit a high electrical conduction property. As a result of the plurality of objects 40B being in contact with each other, a path for electrical conduction is generated. In addition, at least one of the plurality of objects 40B is present in each of the plurality of spaces 30B, in the same manner as Embodiment 2.

It should be noted that the plurality of objects 40B according to the present embodiment each have a spherical shape in the same manner as Embodiment 1 and Embodiment 2, and the diameter of each of the plurality of objects 40B is smaller than one side of each of the plurality of spaces 30B which has a cubic shape.

Next, the three-dimensional net shaped body including the plurality of net lines 20B will be described in detail with referenced to FIG. 5B.

Figure 5B:
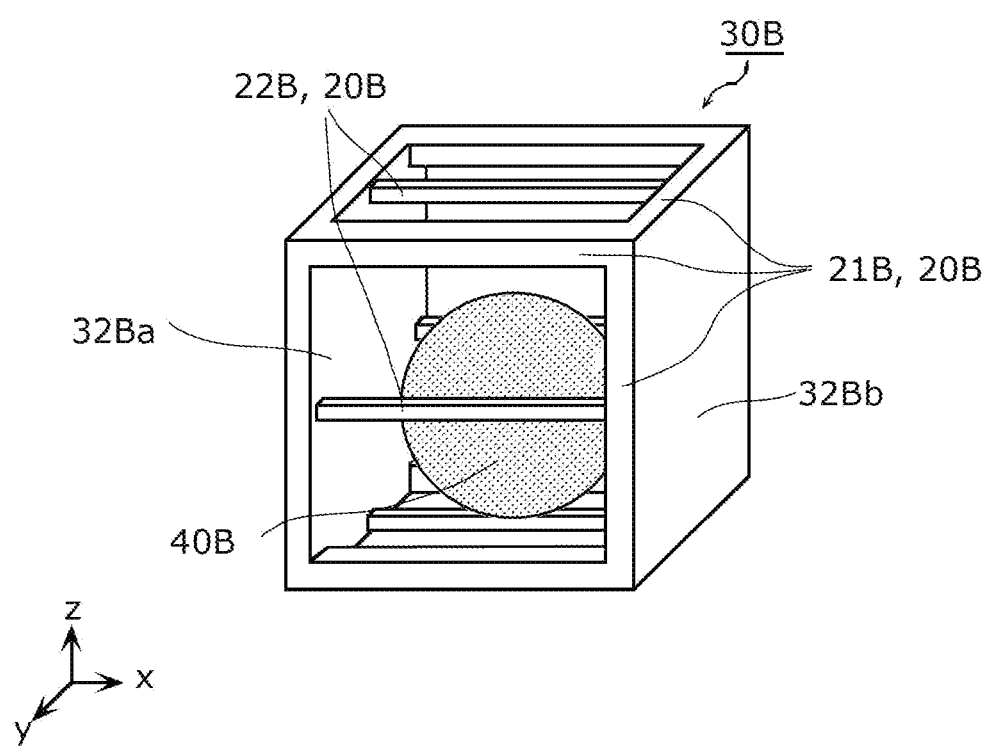
FIG. 5B is an enlarged perspective view of one of a plurality of spaces according to Embodiment 3.

FIG. 5B is an enlarged perspective view of space 30B which is one of the plurality of spaces 30B according to Embodiment 3. More specifically, FIG. 5B is an enlarged perspective view of space 30B located on the most positive side of the x-axis among the plurality of spaces 30B. For that reason, in one of the plurality of spaces 30B illustrated in FIG. 5B, partition wall 32Bb is located on the positive side of the x-axis and partition wall 32Ba is located on the negative side of the x-axis.

The three-dimensional net shaped body according to the present embodiment includes an elastomeric material that exhibits elasticity. Accordingly, the plurality of net lines 20B according to the present embodiment include an elastomeric material that exhibits elasticity. According to the present embodiment, the plurality of net lines 20B include a thermoplastic polyurethane resin material. However, the material included by the plurality of net lines 20B is not limited to the above-described examples.

It should be noted that partition wall 32B may include the same material as or a different material from that of the plurality of net lines 20B. According to the present embodiment, partition wall 32B includes the same material as that of the plurality of net lines 20B.

The three-dimensional net shaped body including the plurality of net lines 20B having the configuration as described above is an elastic body that deforms elastically. An elastic body has the property of changing the shape of the elastic body itself when a force is applied thereto, and restoring the original shape of the elastic body itself when the force is removed. In addition, as a result of the three-dimensional net shaped body deforming elastically, structural body 100B and the plurality of spaces 30B deform as well.

The plurality of net lines 20B according to the present embodiment includes a plurality of primary net lines 21B and a plurality of secondary net lines 22B. The line thickness of the plurality of primary net lines 21B is a larger than the line thickness of the plurality of secondary net lines 22B. Lines extending along the y-axis and extending along the z-axis among the plurality of primary net lines 21B are integrated with partition wall 32B. In the same manner as above, lines extending along the z-axis among the plurality of secondary net lines 22B are integrated with partition wall 32B Next, the behavior of structural product 300B when force P is applied will be described.

Behavior at the Time of Force P Generation

Figure 6:
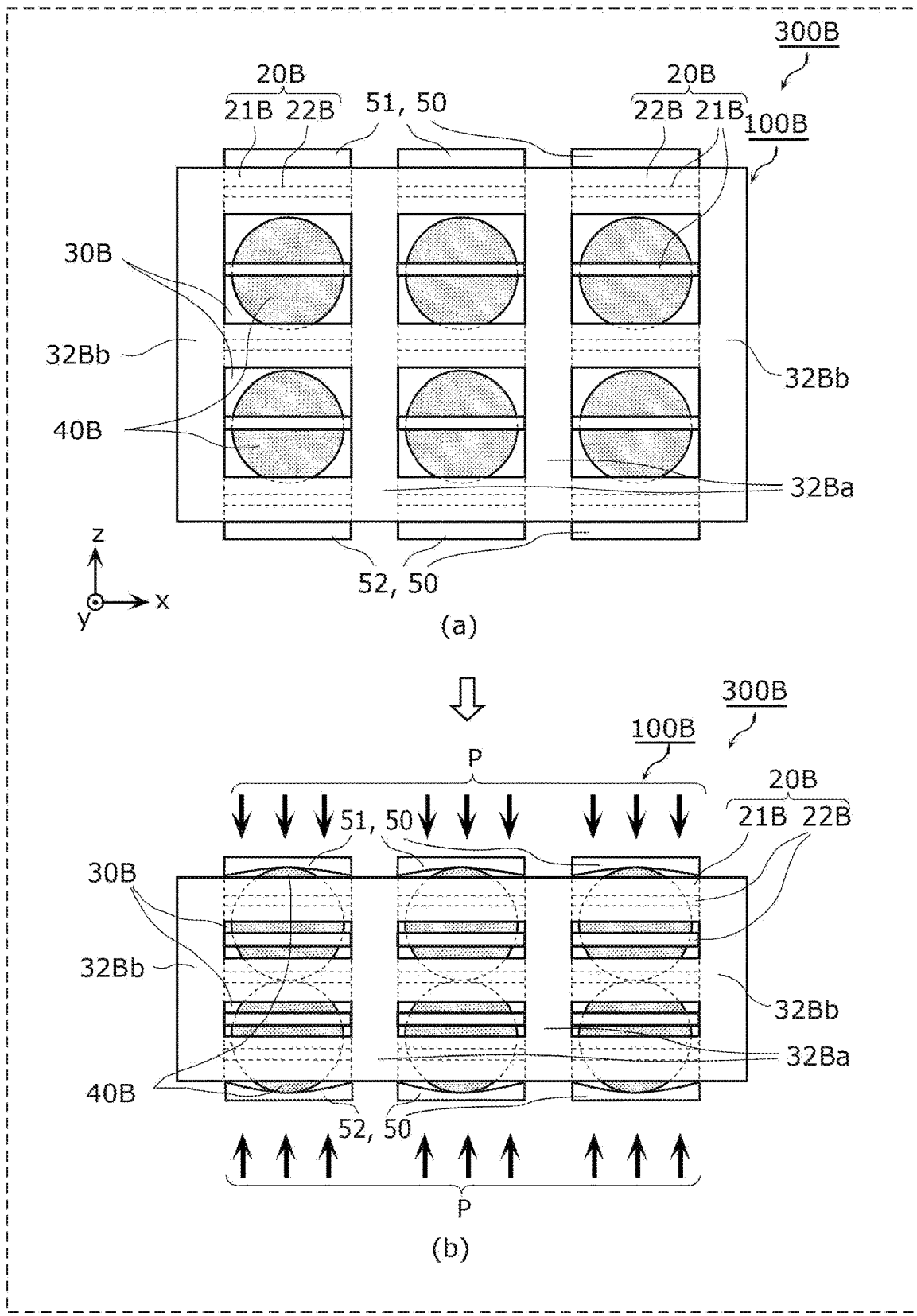
FIG. 6 is a front view of the structural product illustrated in FIG. 5A.

FIG. 6 is a front view of structural product 300B illustrated in FIG. 5A. More specifically, FIG. 6 is a front view of structural product 300B illustrated in FIG. 5A, when viewed in the negative direction of the y-axis. In FIG. 6, (a) indicates the front view of structural product 300B before force P is generated, and (b) indicates the front view of structural product 300B after force P is generated.

Force P that is a pressing force from outside is applied to structural product 300B according to the present embodiment. According to the present embodiment, force P is generated in the directions to hold structural product 300B in between. More specifically, the directions of force P are in the negative direction of the z-axis toward the top surface (the surface on the positive side of the z-axis) of structural product 300B and in the positive direction of the z-axis toward the bottom surface (the surface on the negative side of the z-axis) of structural product 300B.

As described above, the diameter of each of the plurality of objects 40B is smaller than one side of each of the plurality of spaces 30B which has a cubic shape. According to this configuration, as illustrated in (a) in FIG. 6, the plurality of objects 40B are not in contact with each other before force P is generated. For that reason, the electric resistance value between contact point 51 and contact point 52 which are paired with each other is very high, and no current flows between contact point 51 and contact point 52 which are paired with each other.

On the other hand, as illustrated in (b) in FIG. 6, the plurality of objects 40B are in contact with each other after force P is generated, and the plurality of objects 40B are also in contact with contact point 51 and contact point 52. According to this configuration, current flows between contact point 51 and contact point 52 which are paired with each other. This phenomenon is explained by the following mechanism.

The three-dimensional net shaped body according to the present embodiment is an elastic body that deforms elastically. For this reason, structural body 100B deforms elastically according to the direction of force P. As a result, the shape of the plurality of spaces 30B deforms. In other words, the shape of the plurality of spaces 30B deforms such that the volume of the plurality of spaces 30B is reduced.

The position of each of the plurality of objects 40B in a corresponding one space 30B among the plurality of spaces 30B changes in accordance with the deforming of the plurality of spaces 30B. More specifically, each of the plurality of objects 40B moves in a corresponding one space 30B among the plurality of spaces 30B in accordance with the deforming of the plurality of spaces 30B. As a result of the plurality of objects 40B moving, the plurality of objects 40B come into contact with each other. In addition, the plurality of objects 40B are also in contact with contact point 51 and contact point 52. As described above, the surface of the plurality of objects 40B according to the present embodiment is covered by copper which exhibits high electrical conductivity, and thus a path for electrical conduction is generated. In other words, the electric resistance value between contact point 51 and contact point 52 which are paired with each other is very low, and thus current flows between contact point 51 and contact point 52 which are paired with each other. Accordingly, structural product 300B that includes structural body 100B can be used as a pressure sensor.

In addition, when force P is removed, the three-dimensional net shaped body deforms elastically, and structural product 300B returns to the state in which the plurality of objects 40B illustrated in (a) in FIG. 6 are not in contact with each other. In other words, according to the presence or absence of force P, it is possible to control whether current flows between contact point 51 and contact point 52 which are paired with each other. Thus, structural product 300B can also be used as a switching.

To summarize the above, structural product 300B according to the present embodiment includes structural body 100B.

According to this configuration, as a result of the plurality of objects 40B moving, structural product 300B is capable of exerting a novel function of structural body 100B.

In addition, structural product 300B controls at least one of the optical property, the electrical conduction property, the thermal conductive property, or the fluid resistance property of structural body 100B, as a result of the plurality of objects 40B moving. According to the present embodiment, structural product 300B controls the electrical conduction property of structural body 100B. In other words, the novel function of structural body 100B is the function of controlling the electrical conduction property of structural body 100B.

According to this configuration, structural product 300B can be used as a sensor for sensing the flow of current. In addition, structural product 300B can also be used as a switching element.

Meanwhile, structural product 300B can be used for different applications than the above-described sensor or switching element, by changing the property to be controlled.

In addition, structural product 300B according to the present embodiment is an electronic device.

According to this configuration, structural product 300B can be used as an electrical device that can be readily integrated into other devices.

In addition, the three-dimensional net shaped body according to the present embodiment is an elastic body that deforms elastically.

According to this configuration, the shape of the three-dimensional net shaped body changes as a result of force P being applied to the three-dimensional net shaped body, and thus the plurality of objects 40B can be readily moved.

In addition, as described above, structural body 100B according to the present embodiment includes partition wall 32B that restricts the movement of the plurality of objects 40B, and is provided on the boundary planes that define the plurality of spaces 30B.

In addition, in structural body 100B according to the present embodiment, one or more of the boundary planes are included in outermost planes located outermost of the three-dimensional net shaped body, and partition wall 32B is provided on the entirety of one or more of the outermost planes.

According to the above-described configuration, the plurality of objects 40B are inhibited from moving over two or more of the plurality of spaces 30B. In addition, as a result of the above, the plurality of objects 40B are capable of staying within one of the plurality of spaces 30B. Furthermore, it is possible to inhibit the plurality of objects 40B from exiting the three-dimensional net shaped body. In addition, as indicted in the present embodiment, when the three-dimensional net shaped body is an elastic body, it is possible to inhibit structural body 100B from being broken by force P, by providing structural body 100B with partition wall 32B.

Variation of Embodiment 3

Here, a variation of Embodiment 3 will be described. It should be noted that, in the present variation, the detailed description of the structural components common to Embodiment 3 will be omitted.

Although the configuration in which the diameter of each of the plurality of objects 40B is smaller than one side of each of the plurality of spaces 30B which has a cubic shape has been described in Embodiment 3, the present invention is not limited to this example. According to the present variation, the diameter of each of the plurality of objects 40B is larger than one side of each of the plurality of spaces 30B which has a cubic shape.

In other words, according to the present variation, the plurality of objects 40B present in different two or more of the plurality of spaces 30B are in contact with each other. More specifically, even when force P that is a pressing force from outside is not applied to structural product 300B, the plurality of objects 40B are respectively in contact with each other in advance, and current flows between contact point 51 and contact point 52 which are paired with each other.

In addition, according to the present variation, force P is generated in the direction to stretch structural product 300B. In other words, the directions of force P are in the positive direction of the z-axis with respect to the top surface (the surface on the positive side of the z-axis) of structural product 300B and in the negative direction of the z-axis with respect to the bottom surface (the surface on the negative side of the z-axis) of structural product 300B.

According to the present variation, when force P is applied to structural product 300B, structural body 100B deforms elastically according to the direction of force P. As a result, the shape of the plurality of spaces 30B deforms. In other words, the shape of the plurality of spaces 30B deforms such that the volume of the plurality of spaces 30B is increased.

The position of each of the plurality of objects 40B in a corresponding one space 30B among the plurality of spaces 30B changes in accordance with the deforming of the plurality of spaces 30B. More specifically, each of the plurality of objects 40B moves in a corresponding one space 30B among the plurality of spaces 30B in accordance with the deforming of the plurality of spaces 30B. As a result of the plurality of objects 40B moving, each of the plurality of objects 40B is no longer in contact with each other. For that reason, the electric resistance value between contact point 51 and contact point 52 which are paired with each other is very high, and thus current does not flow between contact point 51 and contact point 52 which are paired with each other. Accordingly, structural product 300B that includes structural body 100B according to the present variation can be used as a pressure sensor.

To summarize the above, in structural product 300B according to the present variation, the plurality of objects 40B respectively present in different two or more of the plurality of spaces 30B are in contact with each other.

According to this configuration, as a result of the plurality of objects 40B moving, it is possible to control whether the plurality of objects 40B come into contact with each other. As a result, it is possible to exert the novel function of structural body 100B.

Others

Although the structural body, system, and structural product according to the present invention have been described based on the above-described embodiment, the present invention is not limited to the above-described embodiments.

According to the embodiments, the plurality of net lines includes a plurality of primary net lines having a larger line thickness and a plurality of secondary net lines having a smaller line thickness. However, the plurality of net lines are not limited to this example. All of the plurality of net lines may have the same line thickness. In other words, the primary net line and the secondary net line may be the same line. The cross-section shape of the plurality of net lines may be any shape. For example, the cross-section shape of the plurality of net lines may be a circular or polygonal shape. Furthermore, the cross-section shape of the plurality of net lines may be a circular or polygonal shape with protrusions (e.g., star-shaped, gear-shaped, etc.). In particular, when the shape is that provided with protrusions, restricting the movement of the plurality of objects is facilitated.

In addition, although the plurality of primary net lines and the plurality of secondary net lines included in the plurality of net lines are lines extending along the x-axis, the y-axis, or the z axis according to the embodiments, the plurality of primary net lines and the plurality of secondary net lines are not limited to this example. For example, the plurality of primary net lines and the plurality of secondary net lines may be lines not parallel to any of the x-axis, the y-axis, or the z-axis. In other words, the plurality of primary net lines and the plurality of secondary net lines may be lines that extend in arbitrary directions.

It should be noted that, although the configuration in which the three-dimensional net shaped body exhibits a high rigidity has been described in Embodiments 1 and 2, the configuration of the three-dimensional net shaped body is not limited to this example. For example, the three-dimensional net shaped body according to Embodiment 1 may be an elastic body that deforms elastically, as with the three-dimensional net shaped body according to Embodiment 3. Furthermore, the three-dimensional net shaped body according to Embodiment 1 may include a portion that exhibits a high rigidity and another portion that is an elastic body. In other words, a portion of the plurality of net lines included in the three-dimensional net shaped body may exhibit a high rigidity and another portion of the plurality of net lines may be an elastic body. In the case of the three-dimensional net shaped body in which a portion that is highly rigid and a portion that is an elastic body are combined, when the magnetic field described in Embodiment 1 is generated, the structural body is capable of exerting the function of elastically deforming only the portion that is an elastic body.

In addition, although the boundary plane and the outermost plane are planar according to the embodiments, the boundary plane and the outermost plane may be curved.

Although the energy supply device is a device that includes an electromagnet and generates a magnetic field according to Embodiment 1 and Embodiment 2, the energy supply device is not limited to this example. The energy supply device may generate thermal energy, optical energy, chemical energy, mechanical energy, or the like, or a combination of them.

In addition, although the plurality of objects move as a result of being supplied with energy generated by the energy supply device according to Embodiment 1 and Embodiment 2, the present invention is not limited to this example. For example, the plurality of objects may move according to gravity, as a result of the structural body being tilted with respect to a horizontal plane.

It should be noted that, although iron or copper is used for the plurality of objects according to Embodiments 1, 2, and 3, the plurality of objects are not limited to this example. The material used for the plurality of objects may be selected according to energy that moves the plurality of objects.

In addition, the plurality of objects may include different materials. In other words, for example, one of the plurality of objects may include the first material, and different one of the plurality of objects from the one of the plurality of objects may include the second material that is different from the first material. More specifically, one of the plurality of objects may include iron in the same manner as Embodiment 1, and different one of the plurality of objects from the one of the plurality of objects may include cobalt.

According to Embodiment 2, the type of material having high light absorptivity is selected according to the wavelength that light L contains. For example, when light L is infrared light, the material having high light absorptivity is selected from among the materials that absorb infrared light. In addition, for example, when light L is ultraviolet light, the material having high light absorptivity is selected from among the materials that absorb ultraviolet light.

Although the configuration in which the light transmission property that is one of the optical properties of the structural body is controlled has been described in Embodiment 2, the present invention is not limited to this. For example, the light reflection property or the light scattering property may be controlled.

Although the configuration in which the electrical conduction property of the structural body is controlled has been described in Embodiment 3, the present invention is not limited to this. For example, the thermal conductive property may be controlled. In this case, the plurality of objects may include a material that exhibits high thermal conductivity. For example, a metallic material or the like may be used as the material that exhibits high thermal conductivity. According to this configuration, as a result of the plurality of objects being in contact with each other, a path for thermal conduction is generated.

The following describes the case where the fluid resistance property among the properties of the structural body is controlled. The fluid is water, for example. In such a case, for example, a configuration in which the shape of the opening portion is circular, the shape of the plurality of objects is spherical, and the diameter of each of the plurality of objects is larger than the diameter of the circular shape of the opening portion is used. According to this configuration, when the plurality of objects cover the opening portion, the fluid cannot move over two or more of the plurality of spaces through the opening portion. On the other hand, when the plurality of objects move and do not cover the opening portion, the fluid can move over two or more of the plurality of spaces. In this manner, it is possible to switch between covering and not covering the opening portion by the plurality of objects, according to the movement of the plurality of objects. As a result, it is possible to control the fluid resistance property of the structural body.

It should be noted that the structural body may emit sound as a result of the plurality of objects moving through the plurality of spaces. The structural body may emit a sound by the plurality of objects coming into contact with the plurality of net lines as a result of the plurality of objects moving. In this manner, it is possible to recognize, by the sound, that the plurality of objects have moved.

In addition, although the three-dimensional net shaped body and the plurality of net lines include an ABS resin material or a thermoplastic polyurethane resin material according to the embodiments, the materials of the three-dimensional net shaped body and the plurality of net lines are not limited to these examples. For example, the three-dimensional net shaped body and the plurality of net lines may include a material such as a nylon resin material, a poly-lactic acid (PLA) resin material, a polycarbonate resin material, a polycarbonate/ABS alloy resin material, a poly phenyl sulfone (PPSF/PPSU) based resin material, an acrylate-styrene-acrylonitrile (ASA) based resin material, a poly ether ether ketone (PEEK) based resin material, a poly ether imide (PEI) resin material, an epoxy resin material, a polypropylene resin material, a vinyl chloride resin material, a Teflon (registered trademark) resin material, a polyethylene terephthalate resin material, or the like. In addition, not limited to the above-described materials, the three-dimensional net shaped body and the plurality of net lines may include a material such as an engineering plastic or a super engineering plastic. The materials that the three-dimensional net shaped body and the plurality of net lines include are selected according to the application of the structural body.

As described in Embodiment 1, the three-dimensional net shaped body was manufactured by the material extrusion method. However, the method of manufacturing the three-dimensional net shaped body is not limited to this example. For example, the three-dimensional net shaped body can be manufactured by the liquid tank photopolymerization method.

The liquid tank photopolymerization method is conducted according to the following procedure. The material that the three-dimensional net shaped body includes has fluidity. The material that the three-dimensional net shaped body includes is exposed to a predetermined stimulus so as to be a three-dimensional manufacturing target that is desired to be manufactured. As a result, the material that the three-dimensional net shaped body includes becomes a cured layer. The three-dimensional manufacturing target that is desired is obtained by stacking the cured layers. For example, an ultraviolet-curing resin can be used as the material that the three-dimensional net shaped body includes, and ultraviolet rays can be used as the predetermined stimulus.

In addition, although the structural body has been manufactured by arranging the plurality of objects to be present in the plurality of spaces in the middle of the manufacturing of the three-dimensional net shaped body, the manufacturing of the structural body is not limited to this example. For example, when the three-dimensional net shaped body is an elastic body that deforms elastically as described in Embodiment 3, the plurality of objects may be inserted through the opening portion by elastically deforming the shape of the opening portion after the three-dimensional net shaped body is manufactured. In addition, the plurality of objects can be manufactured by a 3D printer using a material extrusion method, in the same manner as the manufacturing of the three-dimensional net shaped body. In this case, when the plurality of objects and the three-dimensional net shaped body include the same material, filaments of the same material can be used. On the other hand, when the plurality of objects and the three-dimensional net shaped body include different materials, filaments of different materials can be respectively used. In addition, for the manufacturing of the plurality of objects, the liquid tank photopolymerization method, the material injection method, the binder injection method, powder bed melt bonding method, or the like can be used, in the same manner as the manufacturing of the three-dimensional net shaped body.

It should be noted that, although the structural body is mounted on the mounting base according to Embodiments 1 and 2, the present invention is not limited to this example. The structural body may be placed in any manner as long as the structural body is capable of receiving energy supplied by the energy supply device. In addition, the system need not necessarily include the mounting base and the column support.

Additionally, embodiments arrived at by those skilled in the art making modifications to the above embodiments, as well as embodiments arrived at by combining various structural components and functions described in the above embodiments without materially departing from the novel teachings and advantages of the present invention are intended to be included within the scope of the present invention.

The invention claimed is:

1. A structural body comprising:
   a three-dimensional net shaped body including a plurality of net lines that form a three-dimensional net shape; and
   a plurality of objects respectively present in two or more of a plurality of spaces partitioned by the plurality of net lines, wherein
   the plurality of objects are each a mobile object that moves only within one of the plurality of spaces or moves only over two or more of the plurality of spaces, and
   the plurality of objects each include at least one of a metallic material or an inorganic compound material; and
   wherein the three-dimensional net shaped body is an elastic body that deforms elastically.

2. The structural body according to claim 1, wherein the plurality of objects and the plurality of net lines have a configuration that prevents the plurality of objects from moving over two or more of the plurality of spaces.

3. The structural body according to claim 1, further comprising:
   a partition wall that restricts movement of the plurality of objects, wherein
   the partition wall is provided on a boundary plane that defines the plurality of spaces.

4. The structural body according to claim 3, wherein the boundary plane comprises a plurality of boundary planes,
   one or more of the plurality of boundary planes are included in outermost planes located outermost of the three-dimensional net shaped body, and
   the partition wall is provided on an entirety of one or more of the outermost planes.

5. The structural body according to claim 1, wherein the plurality of objects include a first object and a second object, and
   the first object and the second object are present in one of the plurality of spaces.

6. The structural body according to claim 1, wherein at least one of the plurality of objects is present in each of the plurality of spaces.

7. The structural body according to claim 1, wherein the plurality of spaces are arranged in a first direction, a second direction, and a third direction perpendicular to one another.

8. The structural body according to claim 1, A structural body comprising:
   a three-dimensional net shaped body including a plurality of net lines that form a three-dimensional net shape; and
   a plurality of objects respectively present in two or more of a plurality of spaces partitioned by the plurality of net lines, wherein
   the plurality of objects are each a mobile object that moves only within one of the plurality of spaces or moves only over two or more of the plurality of spaces, and
   the plurality of objects each include at least one of a metallic material or an inorganic compound material; and
   wherein the plurality of objects each have a spherical shape.

9. A structural body comprising:
   a three-dimensional net shaped body including a plurality of net lines that form a three-dimensional net shape; and
   a plurality of objects respectively present in two or more of a plurality of spaces partitioned by the plurality of net lines, wherein
   the plurality of objects are each a mobile object that moves only within one of the plurality of spaces or moves only over two or more of the plurality of spaces, and
   the plurality of objects each include at least one of a metallic material or an inorganic compound material; and
   wherein the plurality of objects present in different two or more of the plurality of spaces are in contact with each other.

10. A system comprising:
    the structural body according to claim 1; and
    an energy supply device that moves the plurality of objects by supplying energy to the plurality of objects.

11. A structural product comprising:
    the structural body according to claim 1.

12. The structural product according to claim 11, wherein the plurality of objects respectively move inside the plurality of spaces to control at least one of an optical property, an electrical conduction property, a thermal conductive property, or a fluid resistance property of the structural body.

13. The structural product according to claim 11, wherein the structural product is an electronic device.

* * * * *